United States Patent Office 3,463,791
Patented Aug. 26, 1969

3,463,791
7-CHLORO-4-DEDIMETHYLAMINO-12,12α-SECO-TETRACYCLINE-12-OIC ACID-6,12-LACTONES
Saul L. Neidleman, Lawrence Township, N.J., Roland W. Kinney, Berwyn, Pa., and Frank L. Weisenborn, Somerset, N.J., assignors to E. R. Squibb & Sons, Inc., New York, N.Y., a corporation of Delaware
No Drawing. Continuation-in-part of application Ser. No. 290,173, June 24, 1963. This application Oct. 23, 1965, Ser. No. 504,083
Int. Cl. C07d *5/06;* A61k *21/00;* C07c *103/19*
U.S. Cl. 260—343.6                 3 Claims

ABSTRACT OF THE DISCLOSURE

This invention relates to lactone derivatives of 7-chlorotetracycline and 7-chloro-6-demethyltetracycline. The novel compounds, which possess ultraviolet absorption properties, can be prepared by subjecting the latter tetracyclines to the action of the enzyme peroxidase in the presence of dihydroxyfumaric acid.

This application is a continuation-in-part of application Ser. No. 290,173, filed June 24, 1963, now U.S. Patent No. 3,375,276.

This invention relates to new chemical compounds, and more particularly to new tetracycline derivatives and new processes for preparing such derivatives and other known tetracycline derivatives.

The new compounds of this invention include (a) bases of the general formula (I)
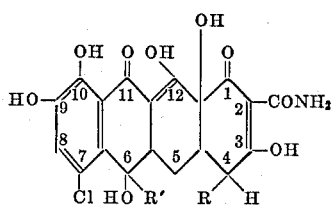

wherein R is hydrogen or dimethylamino and R' is hydrogen or methyl, and salts of those compounds wherein R is dimethylamino (particularly non-toxic acid- addition salts), and (b) lactone derivatives of the formula

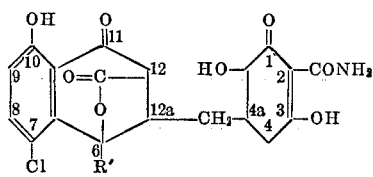

wherein R' is the same as above.

The new compounds of this invention include, therefore, 9-hydroxy-7-chlortetracycline,
4-epi-9-hydroxy-7-chlortetracycline,
9-hydroxy-7-chloro-6-demethyltetracycline,
4-epi-9-hydroxy-7-chloro-6-demethyltetracycline,
9-hydroxy-7-chloro-4-dedimethylaminotetracycline,
9-hydroxy-7-chloro-6-demethyl-4-dedimethylaminotetracycline,
7-chloro-6-demethyl-4-dedimethylamino-12,12a-secotetracycline-12-oic acid 6,12-lactone,
7-chloro-4-dedimethylamino-12,12a-secotetracycline-12-oic acid 6,12-lactone,
7-chloro-6-demethyl-4-hydroxy-4-dedimethylaminotetracycline,
7-chloro-4-hydroxy-4-dedimethylaminotetracycline, as well as salts of those compounds containing a 4-dimethylamino group.

Among the acids which can be used in preparing the salts of this invention may be mentioned inorganic acids, such as the hydrohalic acids (e.g., hydrochloric and hydrobromic acid), sulfuric acid, nitric acid, boric acid and phosphoric acid, and organic acids such as oxalic, tartaric, citric, acetic and succinic acid.

These new compounds of this invention of Formula I (and their acid-addition salts), as well as all other new tetracyclines of this invention, are therapeutically active compounds which possess broad spectrum antibacterial activity against many gram-positive and gram-negative bacteria. Thus, the compounds of this invention can be administered perorally in the same manner as tetracycline in the treatment of bacterial diseases which respond to tetracycline treatment. In addition, the compounds of this invention display a high degree of activity against tetracycline-resistant microorganisms such as certain strains of *staphylococcus aureus,* and hence are compounds of choice in treatment of diseases caused by such microorganisms.

The new compounds of Formula II possess strong ultraviolet absorption properties, and so are suited for use in sunburn preventive preparations, such as creams, lotions or oils which are intended for topical application to filter out the ultraviolet radiation of sunlight.

The new compounds of this invention are prepared by the process of this invention which comprises subjecting 7-chlortetracycline or 7-chloro-6-demethyltetracycline under aerobic conditions to the action of the enzyme peroxidase in the presence of dihydroxyfumaric acid. The nature of the products formed will depend on the conditions under which the reaction is conducted, as more fully described hereinafter.

As sources of the peroxidase enzyme, plant cells and saps, animal tissues (such as liver), body fluids (such as saliva), leucocytes (myeloperoxidase), milk (lactoperoxidase) and many microorganisms may be used. The preferred sources of peroxidase for the purpose of this invention are horseradish and the microorganism, *Myrothecium verrucaria.* The peroxidase obtained from horseradish can be supplied merely by pressing horseradish and using the juice obtained or a purified preparation of horseradish peroxidase may be used. The peroxidase from *Myrothecium verrucaria* can be obtained by culturing the microorganism on a suitable nutrient medium, recovering the mycelium formed and treating the mycelium to recover purified peroxidase.

In addition to the peroxides, dihydroxyfumaric acid is also added to the reaction mixture. Although substantially any concentration of this compound may be used, preferably the dihydroxyfumaric acid is present in a molar ratio of about 68 to 1 to about 1030 to 1 (optimally about 480 to 1 to about 680 to 1) based on the weight of the tetracycline antibiotic. The reaction is preferably conducted at a pH in the range of about 3 to about 8 (optimally about 4.0 to about 6.0 and most advantageously at a pH of about 4.5). To assure that the pH of the reaction mixture is maintained in this range, a buffering agent which buffers in the desired pH range is preferably also added to the reaction medium. Suitable buffers include McIlvaine's buffer, potassium citrate buffer potassium acetate buffer, potassium phosphate buffer and potassium formate buffer.

The reaction is carried out in an aqueous medium under aerobic conditions, normally at a temperature in the range of about 5° C. to about 95° C. (optimally about 22° C. to about 37° C.). If, however, the preferred 9-hydroxytetracyclines are the desired products, the optimum temperature range is from about 6 to about 9° C. The components of the medium, namely, the 7-chlortetracycline or 7-chloro-6-demethyltetracycline, buffering agent, peroxidase and dihydroxyfumaric acid (preferably after adjustment of pH to the desired pH of the reaction medium, as by treatment with a base, such as potassium hydroxide) are merely mixed with water and the resultant mixture agitated or shaken to assure adequate aeration for about 10 to about 240 minutes (optimally about 30 minutes to about 120 minutes).

Although the peroxidase acts merely as a catalyst and hence can be present in any proportion, to assure maximum conversion of the starting tetracycline to the desired final products, the peroxidase is present in a weight ratio of about 0.1 to about 1.0 (optimally about 1.0) based on the tetracycline reactant.

The nature of the product formed will depend in part on the temperature at which the reaction is conducted. Thus, if ambient temperature is used (about 22° C. to about 26° C.) a mixture of products will be formed, which can be separated chromatographically as more fully described in the examples following. Among these products, the following are formed if 7-chloro-6-demethyltetracycline is employed as the tetracycline reactant: the compounds, 7-chloro-6-demethyl-5α,6 - anhydrotetracycline, 7-chloro-6-demethyl - 4 - dedimethylaminotetracycline, 7-chloro-6-demethyl-5α,6-anhydro-4-dedimethylaminotetracycline, 9-hydroxy-7-chloro - 6 - demethyl - 4 - dedimethylaminotetracycline, 7-chloro - 6 - demethyl - 4 - dedimethylamino-12,12a-secotetracycline-12-oic acid 6,12-lactone and 7-chloro-6-demethyl-4-hydroxy - 4 - dedimethylaminotetracycline. If 7 - chlortetracycline is employed as the tetracycline reactant, the following compounds are formed: 7-chloro - 4 - dedimethylaminotetracycline, 7-chloro-5α,6-anhydrotetracycline, 7-chloro-5α,6-anhydro - 4-dedimethyltetracycline, 9-hydroxy-7-chloro-4-dedimethylaminotetracycline, 7-chloro-4 - dedimethylamino-12,12a-secotetracycline-12-oic acid 6,12 - lactone and 7-chloro-4-hydroxy-4 - dedimethylaminotetracycline. All of these new compounds possess broad spectrum antibacterial activity and hence may be used for the same purposes as tetracycline is presently used. Moreover, those bases which contain a dimethylamino group may be converted to their acid-addition salts, such as one of the non-toxic acid-addition salts mentioned hereinbefore, by treatment with the desired acid in the usual manner.

If, however, a temperature in the range of about 2° C. to about 10° C. (optimally about 6° C. to about 9° C.) is used, the major product formed is 9-hydroxy-7-chloro-6-demethyltetracycline, if 7-chloro - 6 - demethyltetracycline is used as the starting tetracycline, and 9-hydroxy-7-chlortetracycline if 7-chlortetracycline is used as the starting tetracycline. The 4-epi derivatives of these new products are also formed under the reaction conditions.

The following examples illustrate the invention (all temperatures being in centigrade):

EXAMPLE 1

A reaction mixture of the following composition is prepared:

| Volume (ml.) | Component | Final concentration |
| --- | --- | --- |
| 1.0 | McIlvaine's buffer, pH 4.0 (Handbook of Chemistry and Physics, 35th ed., Chem. Rubber Publ., Co., Cleveland, Ohio, page 1617). | |
| 1.0 | 7-chloro-6-demethyltetracycline hydrochloride (μg./ml.). | 500 |
| 1.0 | Horseradish peroxidase (Worthington, Grade D) (μg./ml.). | 50 |
| 1.0 | Distilled water. | |
| 1.0 | Dihydroxyfumaric acid (adjusted to pH 4.0 with potassium hydroxide) (mg./ml.). | 10.0 |

The reaction is initiated by the final addition of the enzyme. The mixture is incubated in a glass tube, 25 x 100 mm., at 25° on a rotary shaker with a 2-inch displacement at 280 cycles/minute. At the end of 60 minutes, the reaction products are extracted from the aqueous solution into 1.0 ml. of ethyl acetate. The extract is analyzed by paper chromatography. Samples of 20 μl. are spotted on Whatman No. 1 paper buffered at pH 4.5 with 0.05 M potassium citrate and hydrated by dipping into an aqueous solution of 80% (v./v.) acetone and air-drying to evaporate the acetone. The chromatograms are developed descendingly with hexane:ethyl acetate, 3:1 (v./v.) at room temperature. After development the dried chromatograms are examined visually under an ultraviolet lamp (Mineralite Model SL, maximum emission at 254 mμ) to detect absorbing and fluorescing compounds. Spots are outlined, the chromatogram is then exposed momentarily to ammonia vapor and re-examined under ultraviolet light. Compounds with antibacterial activity are detected by bioautography in the usual manner using an overnight culture of Staphylococcus aureus strain 209P as test organism. The reaction products and some of their properties are listed in the following table. Under "Inhibitory Activity" a plus sign (+) indicates the compound possesses antibacterial activity and a minus sign (−) indicates the compound does not possess antibacterial activity.

TABLE

| Product | Rf | Inhibitory activity | Fluorescence before NH₃ | Fluorescence after NH₃ | U.V. absorption maxima, mμ [1] | Identity |
| --- | --- | --- | --- | --- | --- | --- |
| A | 0.80 | + | Dull orange | Green | 260, 370 | 7-chloro-6-demethyl-4-dedimethylaminotetracycline. |
| B | 0.70 | − | Orange | Orange | 260, 370 | 7-chloro-6-demethyl-4-dedimethylamino-12,12a-secotetracycline-12-oic acid 6,12-lactone. |
| C | 0.94 | + | Red-orange | do | 345 | 7-chloro-6-demethyl-5a,6-anhydrotetracycline. |
| D | 0.98 | + | do | Red-orange | 345 | 7-chloro-6-demethyl-5a,6-anhydro-4-dedimethylaminotetracycline. |
| E | 0.45 | + | Orange | Green | 265, 365 | 7-chloro-6-demethyl-4-hydroxy-4-dedimethylaminotetracycline. |
| F | 0.15 | + | do | Orange | 340 | 9-hydroxy-7-chloro-6-demethyl-4-dedimethylaminotetracycline. |
| G | 0.50 | + | do | Green | 265, 365 | ? |
| H | 0.85 | − | Green | do | | ? |
| I | 0.65 | − | do | do | | ? |
| J | 0 | + | Orange | Orange | | 9-hydroxy-7-chloro-6-demethyltetracycline. |

[1] Measured on paper.

EXAMPLE 2

The reaction is carried out as Example 1 with the exception that the original reaction mixture has been modified to have the following composition:

| Volume (ml.) | Component | Final concentration |
|---|---|---|
| 1.0 | Potassium citrate buffer, pH 5.0 | 0.1 M |
| 1.0 | 7-chloro-6-demethyltetracycline hydrochloride (μg./ml.) | 500 |
| 1.0 | Horseradish peroxidase (Worthington, Grade D) (μg./ml.) | 50 |
| 1.0 | Potassium or ammonium formate (mg./ml.) | 5.0 |
| 1.0 | Dihydroxyfumaric acid (adjusted to pH 5.0 with potassium hydroxide) (mg./ml.) | 10 |

The result of this modification is an alteration in the number and relative concentration of the endproducts which accumulate. These are shown in the following table, wherein plus signs indicate an increase in quantity of the compound in question and a minus sign indicates no increase in quantity relative to Example 1 (the same letters are used to indicate the compound as were used in the preceding table):

Table

| Product: | Stimulation [1] |
|---|---|
| A | +++ |
| B | ++++ |
| C | — |
| D | — |
| E | + |
| F | ++ |
| G | — |
| H | — |
| I | — |
| J | ? |

[1] Due to added formate.

EXAMPLE 3

The reaction is carried out as in Example 1 with the exception that the original reaction mixture has been modified to have the following composition:

| Volume (ml.) | Component | Final concentration |
|---|---|---|
| 1.0 | Potassium acetate buffer, pH 4.5 | 0.1 M |
| 1.0 | 7-chloro-6-demethyltetracycline hydrochloride (μg./ml.) | 500 |
| 1.0 | Horseradish peroxidase (Worthington, Grade D) (μg./ml.) | 50 |
| 1.0 | Chloro-p-phenylenediamine dihydrochloride (μg./ml.) | 100 |
| 1.0 | Dihydroxyfumaric acid (adjusted to pH 4.5 with potassium hydroxide) (mg./ml.) | 10 |

The result of this modification is an alteration of the number and relative concentration of the endproducts which accumulate as compared to Example 1.

These are shown in the following table:

Table

| Product: | Stimulation [1] |
|---|---|
| A | ++++ |
| B | ++ |
| C | — |
| D | — |
| E | — |
| F | +++ |
| G | +++ |
| H | — |
| I | — |
| J | ? |

[1] Due to chloro-p-phenylenediamine dihydrochloride.

EXAMPLE 4

The reaction is carried out as in Example 3 but substituting 1.0 ml. of potassium formate, at a final concentration of 0.1 M, for the potassium acetate buffer. This buffers the reaction medium at pH 4.0. The result of this modification as compared to Example 1 is shown in the following table:

Table

| Product: | Stimulation [1] |
|---|---|
| A | ++++ |
| B | +++ |
| C | — |
| D | — |
| E | — |
| F | ++++ |
| G | +++ |
| H | — |
| I | — |
| J | — |

[1] Due to chloro-p-phenylenediamine dihydrochloride and formate.

EXAMPLE 5

The reaction is carried out as described in Example 2 except that a crude press juice of fresh horseradish root is substituted for the partially purified peroxidase. Essentially the same results are obtained as were obtained in Example 2.

EXAMPLE 6

The reaction is carried out as described in Example 1 with the exception that a highly purified preparation of horseradish peroxidase is employed (Worthington Biochemical Corporation, Grade A). Essentially the same results are obtained as were obtained in Example 1.

EXAMPLE 7

The reaction is carried out on a rotary shaker (280 cycles/min.; 2″ displacement) at 6°–9° for 120 minutes in twenty 250 ml. Erlenmeyer flasks each containing 50 ml. of the following reaction mixture:

| Volume (ml.) | Component | Final concentration |
|---|---|---|
| 10 | Potassium phosphate buffer pH 6.0 | 0.1 M |
| 5 | 7-chloro-6-demethyltetracycline (μg./ml.) | 500 |
| 5 | Horseradish peroxidase (Worthington, Grade D) (μg./ml.) | 50 |
| 20 | Distilled water | |
| 10 | Dihydroxyfumaric acid (adjusted to pH 4.0 with potassium hydroxide) (mg./ml.) | 9 |

The major reaction product is 9-hydroxy-7-chloro-6-demethyltetracycline which is recovered in the manner detailed below. There is formed in addition, under the conditions of this reaction, 4-epi-9-hydroxy-7-chloro-6-demethyltetracycline.

The contents of the reaction vessels are pooled, giving a volume of 1 liter which is extracted with 500 ml. ethyl acetate. The ethyl acetate layer is discarded and the aqueous layer is saturated with $(NH_4)_2SO_4$. The mixture is then extracted with 500 ml. and then 250 ml. ethyl acetate. The ethyl acetate extracts are pooled, dried with anhydrous $Na_2SO_4$, filtered, and then evaporated to dryness at temperatures <35° and reduced pressure. The dry weight of the orange-brown solid thus obtained is 150 mg.

This material contains 9-hydroxy-7-chloro-6-demethyltetracycline, the desired product, and unreacted substrate 7-chloro-6-demethyltetracycline. These two antibiotic substances are separated by cellulose column chromatography. Two hundred and fifty grams of Whatman standard grade cellulose powder is slurried with 0.3 M phosphate buffer, pH 3.0, filtered and dried. The powder is then suspended in sec-butanol:$H_2O$ (4:1) and poured as a column 3.7 x 32 cm. Four hundred and fifty milligrams of material prepared according to the procedure described above is dissolved in sec-butanol:$H_2O$ (4:1) and loaded onto the column. Elution of the substituent antibiotics is carried out with sec-butanol:$H_2O$ (4:1) at the rate of 0.5 ml./min. with fractions collected every 20 minutes. Each fraction collected is chromatographically analyzed using Whatman No. 1 paper buffered at pH 3.0 with 0.3 M phosphate buffer using n-butanol saturated with water. Fractions containing 9-hydroxy-7-chloro-6-demethyltetracycline free of 7-chloro-6-demethyltetracycline are pooled giving a volume of 250 ml. The sec-butanol is then successively extracted with 100, 50, and 50 ml. portions of 0.01 N HCl. The 0.01 N HCl extracts are pooled and extracted twice with 50 ml. aliquots of ethyl acetate. The ethyl acetate extracts are combined and extracted with two 25 ml. aliquots of 0.01 N HCl. The 0.01 N HCl fractions are pooled with the previous 0.01 N HCl solution. The combined 0.01 N HCl extracts are saturated with $(NH_4)_2SO_4$ and extracted with ten 25 ml. aliquots of ethyl acetate. The ethyl acetate fractions are pooled, dried with anhydrous $Na_2SO_4$, filtered, and evaporated to dryness at temperatures $<35°$ C. and reduced pressure. The yield is 40 mg. of a yellow powder which is about 40% 9-hydroxy-7-chloro-6-demethyltetracycline.

Crude product (200 mgs.) isolated from a number of reactions such as described above is dissolved in methanol and further purified by chromatography on Whatman 3MM paper buffered at pH 3. After application of the sample, the paper is equilibrated for one hour over warm water and then developed with water-saturated butanol. The band corresponding to the 9-hydroxy-derivative is located by its ultraviolet absorption, cut out, and eluted from the paper with methanol. The residue obtained on evaporation of the methanol is distributed between 60% ammonium sulfate solution and ethyl acetate. The ethyl acetate extract is dried over sodium sulfate, concentrated to dryness and the product recrystallized from ethyl acetatehexane to yield 60 mgs. of pure 9-hydroxy-7-chloro-6-demethyltetracycline which sinters and decomposes above 200°;

$\lambda_{max.}^{.01\ N\ HCl-methanol}$ 235 m$\mu$ ($\epsilon$=26,500); 266 m$\mu$ ($\epsilon$=25,000); 347 m$\mu$ ($\epsilon$=10,400).

*Analysis.*—Calcd. for $C_{21}H_{21}O_9N_2Cl \cdot H_2O$: C, 50.56; H, 4.65; Cl, 7.13. Found: C, 50.72; H, 4.75; Cl, 7.27.

EXAMPLE 8

The reaction is carried out essentially as in Example 1 with the exception that a crude peroxidase preparation from the microorganism *Myrothecium verrucaria* ATCC 9095 (American Type Culture Collection, Washington, D.C.) is employed and the incubation temperature is 25°.

The peroxidase is obtained by growing the microorganism for five days at 25° in a soybean meal-glucose medium of the following composition:

| | G. |
|---|---|
| Archer-Daniels-Midland extracted soybean meal | 30 |
| Glucose | 50 |
| $CaCO_3$ | 7 |
| Distilled water, to make 1 liter. | |

The mycelium is recovered by filtration, dried with anhydrous acetone in the usual manner, and ground to a fine powder. The dry powder is stored in a dessicator at about 4° until immediately before use, when it is extracted with distilled water. The solution is used as the source of the enzyme. Essentially the same results are obtained as were obtained in Example 1.

EXAMPLE 9

The reaction is carried out as in Example 8 except that the solution of the enzyme is partially purified by precipitation with ammonium sulfate. Powdered ammonium sulfate is added to the distilled water extract of the acetone powder of *M. verrucaria* to the point of 50% saturation. The protein precipitate which forms is collected by centrifugation, and is redissolved in water. This concentrated solution of protein can be used as such, or freed of residual ammonium sulfate by dialysis against water overnight at 4–6°. Essentially the same results are obtained as were obtained in Example 1.

EXAMPLE 10

The reaction is carried out as in Example 1 except that 7-chlortetracycline is used in place of 7-chloro-6-demethyltetracycline as the substrate. The reaction products and some of their properties are listed in the following table. Under "Inhibitory Activity" a plus sign (+) indicates antibacterial activity against *Staphylococcus aureus* strain 209–P, and a minus sign (−) indicates that the compound does not possess antibacterial activity against this strain.

TABLE

| Compound | R | Appearance under U.V. Before NH₃ | After NH₃ | Bio-activity | Identity |
|---|---|---|---|---|---|
| A | 0.80 | Orange | Green | + | 4-dedimethyl-amino-chlortetracyline. |
| B | 0.70 | do | Orange | − | 4-dedimethylamino-6,12-lactone-chlortetracycline. |
| C | 0.92 | do | Red | + | 5α,6-anhydro-chlortetracycline. |
| D | 0.98 | do | Red | + | 5α,6-anhydro-4-dedimethylamino-chlortetracycline. |
| E | 0.45 | do | Green | + | 4-hydroxy-4-dedimethylamino-chlortetracycline. |
| F | 0.26 | (absorbing) | | + | 4-dedimethylamino-9-hydroxychlortetracycline. |
| G | 0.50 | Orange | Green | + | |
| H | 0.85 | Green | do | − | |
| I | 0.0 | Orange | Orange | + | 9-hydroxychlortetracycline. |
| J | 0.17 | do | do | − | |
| K | 0.47 | do | do | − | |
| L | 0.30 | do | do | − | |

EXAMPLE 11

The reaction is carried out as in Example 7 except that 7-chlortetracycline is substituted for 7-chloro-6-demethyltetracycline. The major reaction product is 9-hydroxy-7-chlortetracycline. There is formed, in addition, under the reaction conditions 4-epi-9-hydroxy-7-chloro-6-demethyltetracycline.

What is claimed is:
1. A compound of the formula

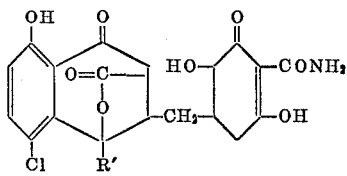

wherein R' is selected from the group consisting of hydrogen and methyl.

2. 7-chloro-6-dimethyl-4-dedimethylamino-12,12α-secotetracycline-12-oic acid 6,12-lactone.

3. 7-chloro - 4 - dedimethylamino-12,12α-secotetracycline-12-oic acid 6,12-lactone.

References Cited

UNITED STATES PATENTS 3,330,841   7/1967   Hlavka et al. _____ 260—559 X

OTHER REFERENCES

Morrison & Boyd, "Organic Chemistry," Allyn & Bacon, Inc., p. 710 (1959).

ALEX MAZEL, Primary Examiner

J. A. NARCAVAGE, Assistant Examiner

U.S. Cl. X.R.

195—29; 260—559, 999; 424—60